United States Patent
Chang et al.

(10) Patent No.: US 6,693,632 B2
(45) Date of Patent: Feb. 17, 2004

(54) METHOD OF AREA PARTITION IN VIRTUAL ENVIRONMENT

(75) Inventors: Chieh-Chih Chang, Taoyuan Hsien (TW); Ming-Fen Lin, Hsinchu (TW); Chien-Lin Lien, Hsinchu (TW)

(73) Assignee: Industrial Technology Research Institute (TW)

( * ) Notice: Subject to any disclaimer, the term of this patent is extended or adjusted under 35 U.S.C. 154(b) by 284 days.

(21) Appl. No.: 09/965,184

(22) Filed: Sep. 28, 2001

(65) Prior Publication Data

US 2003/0020713 A1 Jan. 30, 2003

(30) Foreign Application Priority Data

Jul. 27, 2001 (TW) ........................................ 90118430 A

(51) Int. Cl.7 ............................................... G06T 15/00
(52) U.S. Cl. ........................ 345/423; 345/502; 345/505
(58) Field of Search ................................. 345/473, 502, 345/505

(56) References Cited

U.S. PATENT DOCUMENTS 6,304,266 B1 * 10/2001 Li .............................. 345/424

* cited by examiner

*Primary Examiner*—Mark Zimmerman
*Assistant Examiner*—Micheal Whelpley
(74) *Attorney, Agent, or Firm*—Birch, Stewart, Kolasch & Birch, LLP

(57) ABSTRACT

A method of area partition in virtual environment is disclosed. It can be used to divide 3D (Three Dimensions) virtual environment into several subareas. The invention interposes neighboring subareas so that the subareas in the same plane and the subareas in adjacent planes mix with one another. Both the number of subareas adjacent to each subarea and the number of subareas an object crosses can be decreased, thus lowering the load in operations.

13 Claims, 7 Drawing Sheets

METHOD OF AREA PARTITION IN VIRTUAL ENVIRONMENT

BACKGROUND OF THE INVENTION

1. Field of the Invention

The invention relates to a method of area partition in 3D virtual environment. In particular, it relates to a virtual environment partition method that can reduce the number of subareas adjacent to each subarea and the number of subareas an object crosses after the partition.

2. Related Art

In a virtual environment (e.g. virtual communities and multiple user online games), a larger environment is usually divided into several smaller groups for the convenience of assigning a server or a multicast group to each of the small groups. Therefore, one has to properly divide areas in order to obtain an optimal dividing scheme. Such a partition has to cover the whole space. The obtained subareas have to closely connect one another. The partition method has to have fixed logic rules for fast operations. In order to avoid delay when an object crosses different subareas, the information for adjacent subareas is often loaded in advance. Therefore, the number of adjacent subareas of each subarea after the partition should be as few as possible. Furthermore, when an object crosses certain subareas, the system has to compute all data in the subareas at the same time. Accordingly, the number of subareas an object can cross should also be as few as possible. This can facilitate computations and lower the burden of operations.

For example, conventional virtual environments are 2D (Two Dimensions). The most simplistic partition method is to divide the virtual environment into lattices. That is, a simple 2D coordinate system is used. The number of subareas for each subarea is 8 and the largest number of subareas an object can cross is 4. Therefore, in a virtual environment divided in this way, the data of the subareas adjacent to the subarea where the object is located have to be loaded in advance. This can facilitate processing when the object moves to one of the adjacent subareas. When an object crosses several subareas, the data of these subareas have to be processed at the same time. In this case, there are at most 4 subareas.

To reduce the load in operations, some designers have proposed using interposed lattices or hexagons. In these methods, the number of adjacent subareas of a subarea is 6 and the largest number of subareas an object can possibly cross is 3. Obviously, these methods can improve the problem of large loads in the aforementioned simplistic partition method.

Current virtual environments have been developed into 3D (Three Dimensions). The partition method uses the simplest lattice cubes, as shown in FIG. 1. Each subarea is recorded using two 3D coordinates (the diagonal points 11, 12 in the drawing). Whether an object falls in this subarea is determined by a logical condition (comparing the coordinates of the object with the two diagonal points). The number of subareas of each subarea is 26 and the largest number of subareas an object can possibly cross is 8 (such as the object 21 in the drawing). Processing in such an environment is indeed a large burden. However, no efficient solution to this problem is currently available.

SUMMARY OF THE INVENTION

In light of the foregoing problems, the invention provides a method of area partition in virtual environment. After the partition, the number of subareas adjacent to each subarea and the number of subareas an object can possibly cross are reduced, thus lowering the complexity and load in calculations.

According to the disclosed method, 3D virtual environment is first divided into a plurality of sheet-like areas along one of the dimensions. Then each sheet-like area is divided into a plurality of stripe-like areas along another dimension and the stripe-like areas of different sheet-like areas are interposed. Finally, each stripe-like area is divided into a plurality of subareas and the subareas of adjacent stripe-like areas (including the ones from the same and different sheet-like areas) are interposed. This method can reduce the number of adjacent subareas of each subarea and the number of subareas an object can possibly cross. Therefore, the invention can effectively lower the burden of operations performed by the system.

BRIEF DESCRIPTION OF THE DRAWINGS

The invention will become more fully understood from the detailed description given hereinbelow. However, the following description is for purposes of illustration only, and thus is not limitative of the invention, wherein.

DETAILED DESCRIPTION OF THE INVENTION

Figure 1:
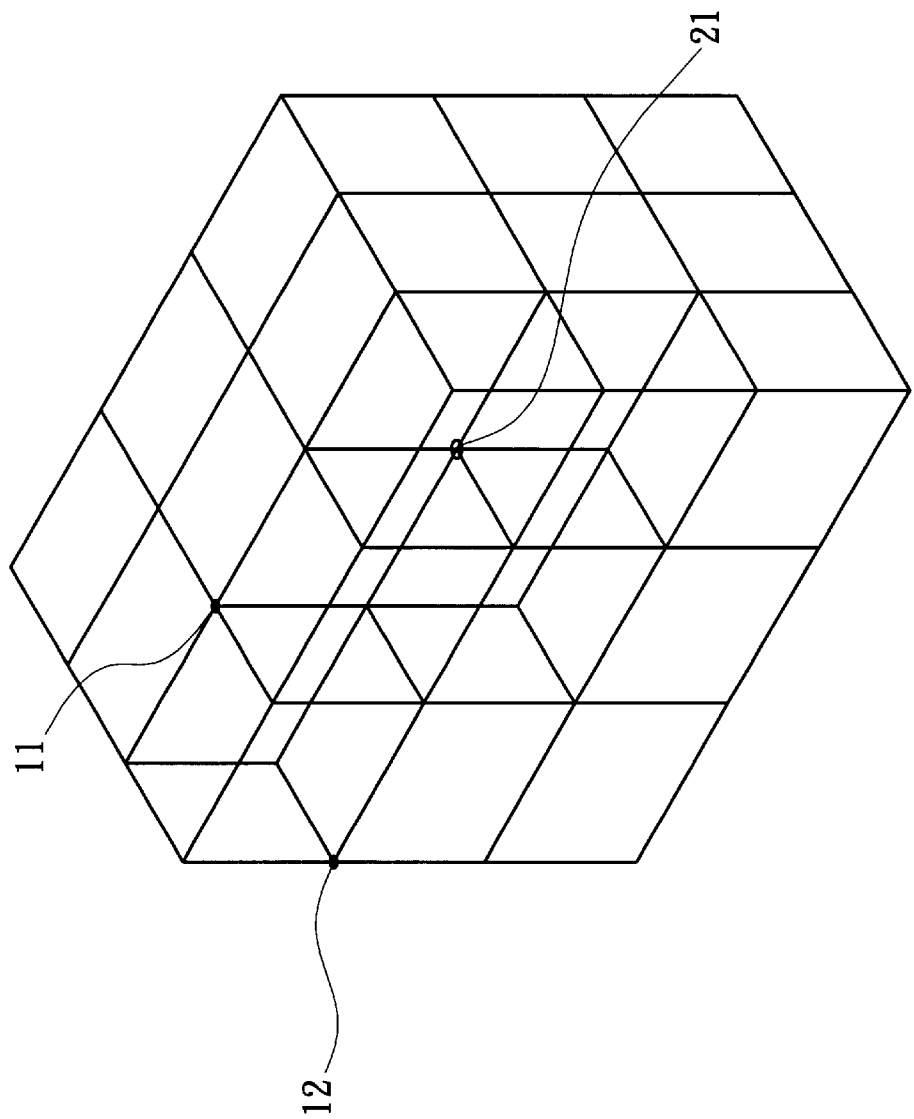
FIG. 1 is a schematic view of a conventional 3D virtual environment dividing method.
Figure 2:
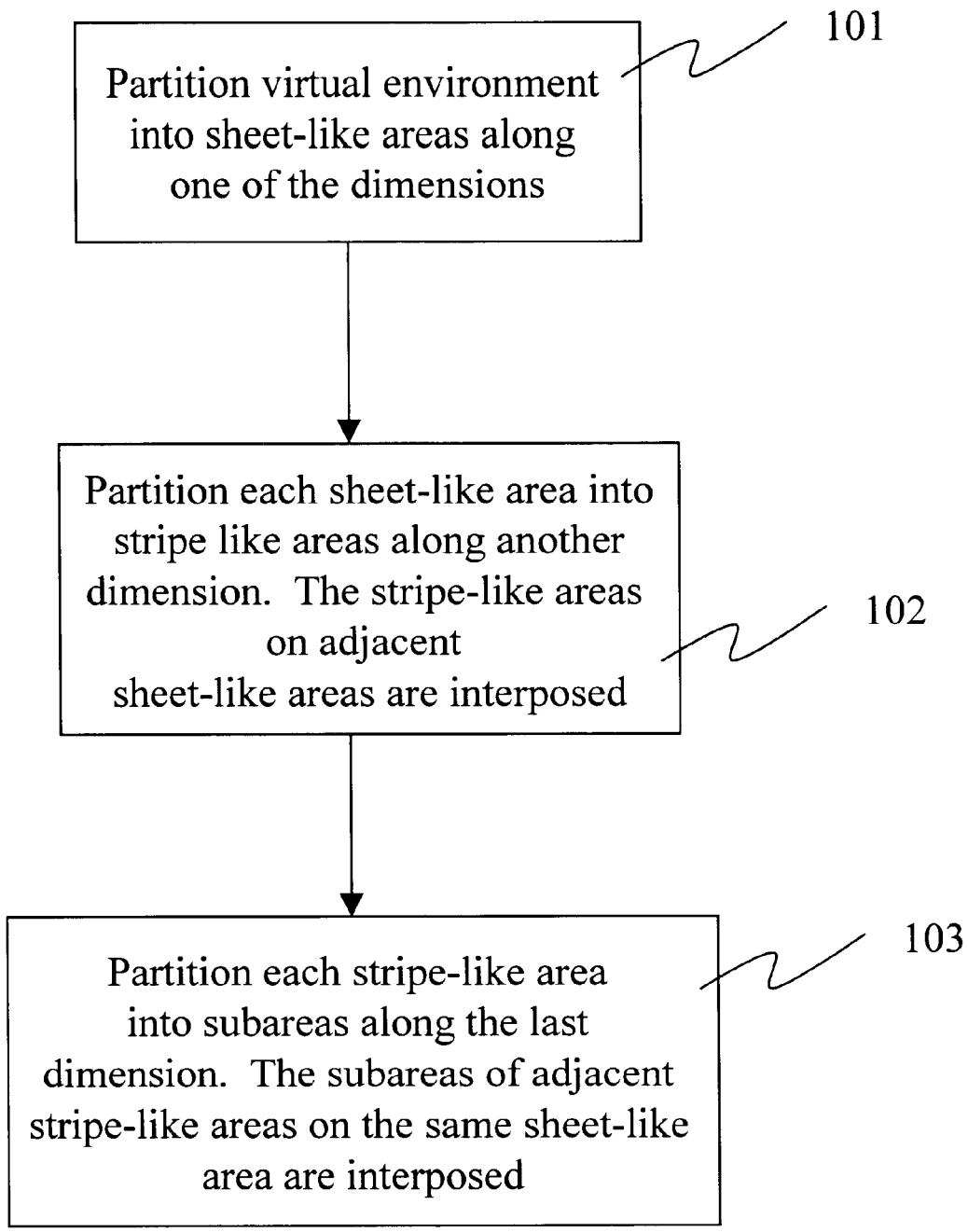
FIG. 2 shows the procedure of the invention.
Figure 3A:
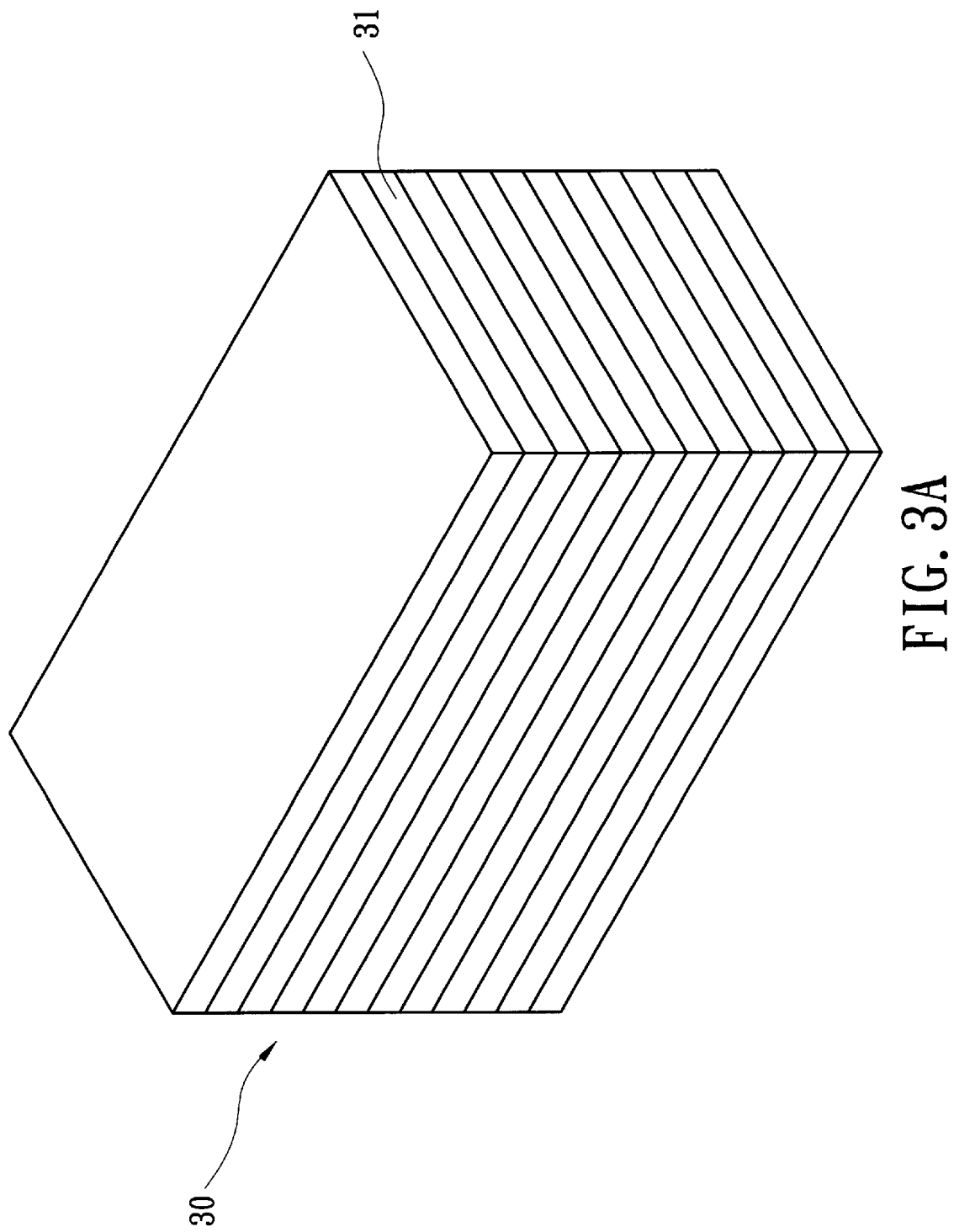
FIGS. 3a through 3c are schematic views of dividing 3D virtual environment.
Figure 3B:
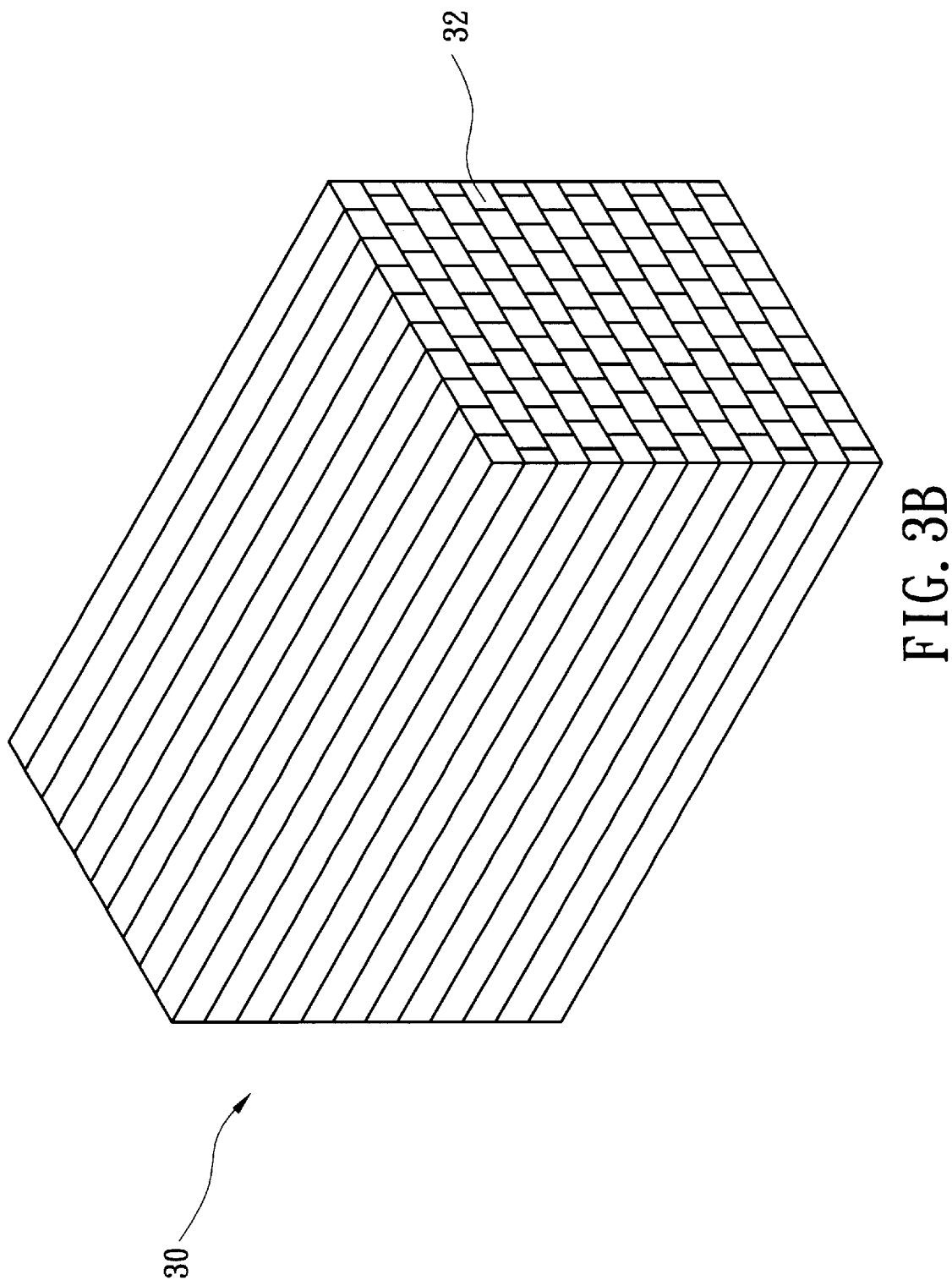

In accordance with the disclosed virtual environment partition method, the virtual environment 30 in FIG. 2 is 3D space. First, the virtual environment 30 is divided into more than one sheet-like area 31 along one of the dimensions (step 101), as shown in FIG. 3a. The partition can be performed along any dimension and the sheet-like areas 31 can have equal or unequal widths. Dividing the sheet-like areas 31 in equal widths can simplify the partition and computations (dividing in unequal widths makes the recording and computations of divided subareas more difficult, though their logic conditions are alike). Afterwards, each of the sheet-like areas 31 is divided into stripe-like areas 32 along any of the other two dimensions (step 102). The stripe-like areas 32 in adjacent sheet-like areas 31 are interposed, as shown in FIG. 3b. That is, the partition lines of the stripe-like areas 32 on adjacent sheet-like areas 31 are not on the same plane. Due to the interposition, the number of adjacent stripe-like areas is reduced. The stripe-like areas 32 do not need to have equal widths. Nevertheless, stripe-like areas 32 with equal widths will greatly simplify computations.

Figure 3C:
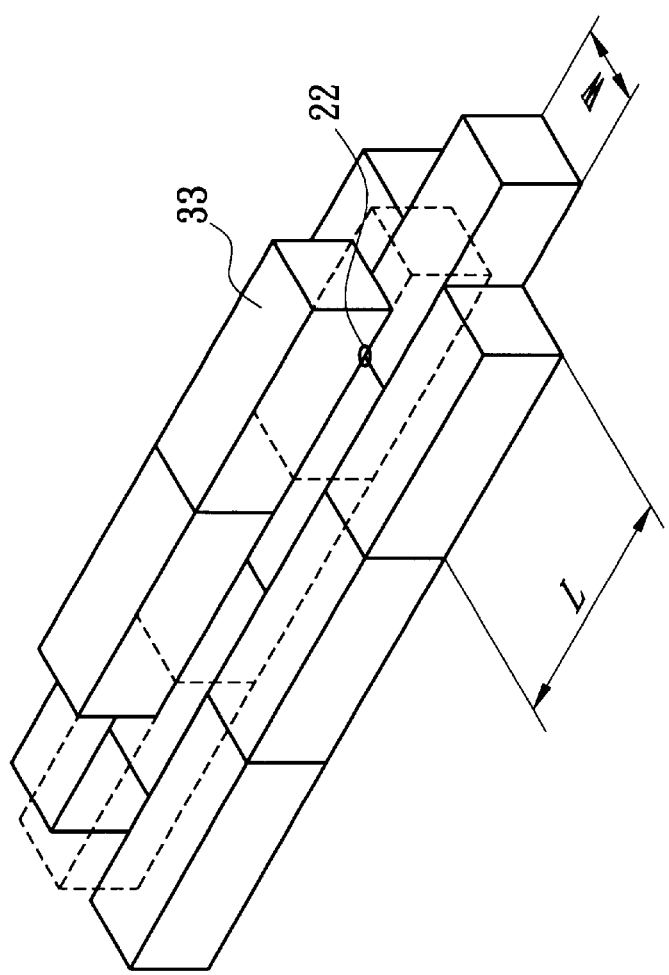

Finally, each stripe-like area 32 is divided into more than one subarea 33 along the last dimension (step 103). The subareas 33 of adjacent stripe-like areas 32 on the same sheet-like area 31 are interposed, as shown in FIG. 3c. That is, the partition lines of the subareas 33 of adjacent stripe-like areas 32 on the same sheet-like area 31 are not on the same plane. Similarly, the number of adjacent subareas is reduced. Of course, the divided adjacent subareas 33 on different sheet-like areas 31 can be further interposed to reduce adjacent subareas. The subareas 33 do not need to have equal width, but those with equal widths are more convenient for computations.

The divided subareas 33 can be rectangular or cubic (the former being shown in the drawing); however, rectangular partition is better. Certainly, regular interposition will simplify the computations (FIG. 3b). The stripe-like areas 32 in adjacent sheet-like areas 31 are interposed by half of the width W (FIG. 3c). The subareas 33 of adjacent stripe-like areas 32 on the same sheet-like area 31 use half of the length L for interposition. The subareas 33 of adjacent sheet-like areas 32 on different sheet-like areas 31 use a quarter of the length L for interposition. From the viewpoint of neighboring stripe-like areas 32, three quarters of the length L are overlapping. Consequently, the number of adjacent subareas 33 of each subarea 33 is reduced to 14 and the largest number of subareas 22 an object can possibly cross is only 4. Thus, the load of computations is greatly reduced.

Figure 4A:
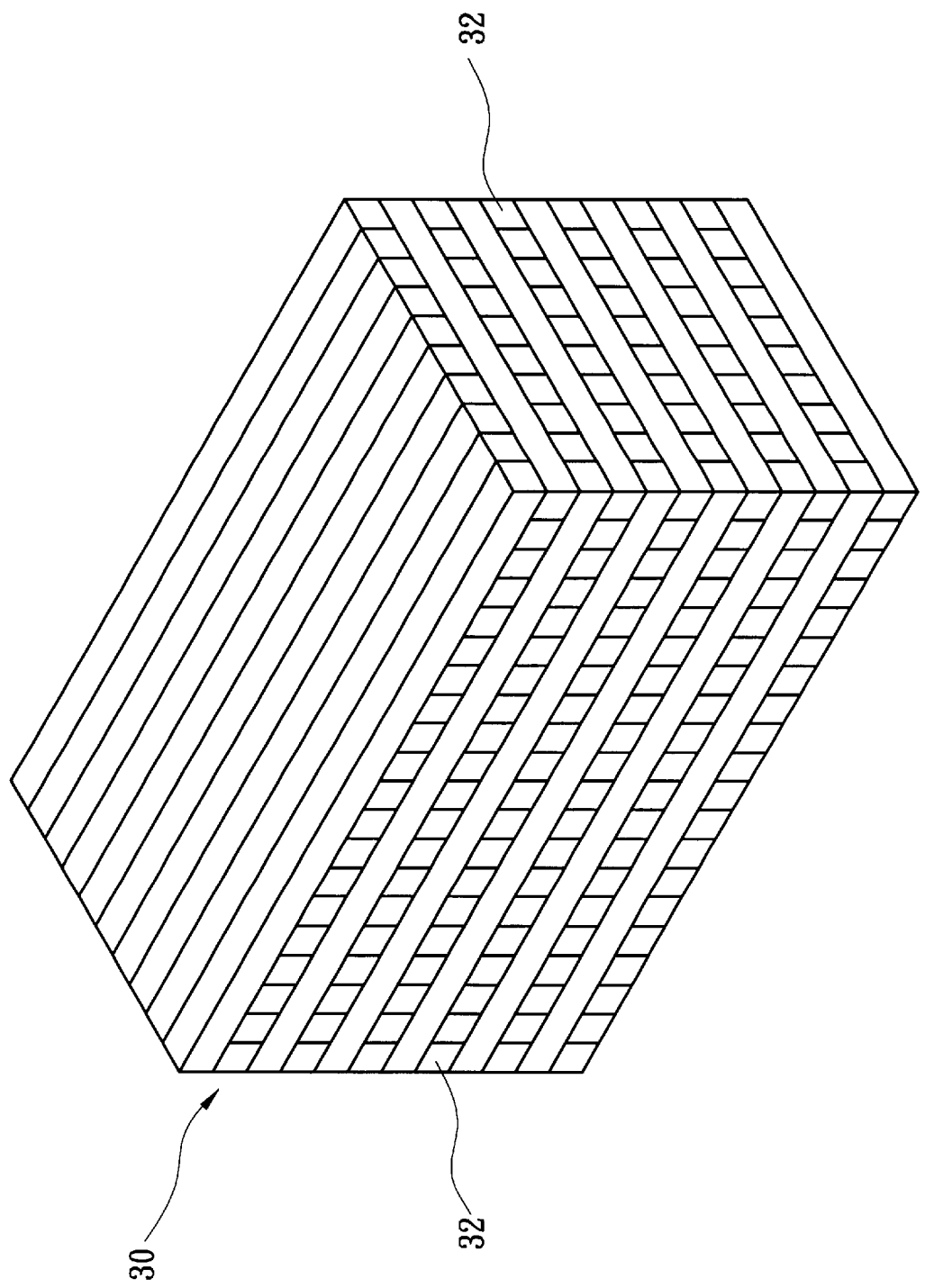
FIGS. 4a and 4b show the second embodiment of the invention.
Figure 4B:
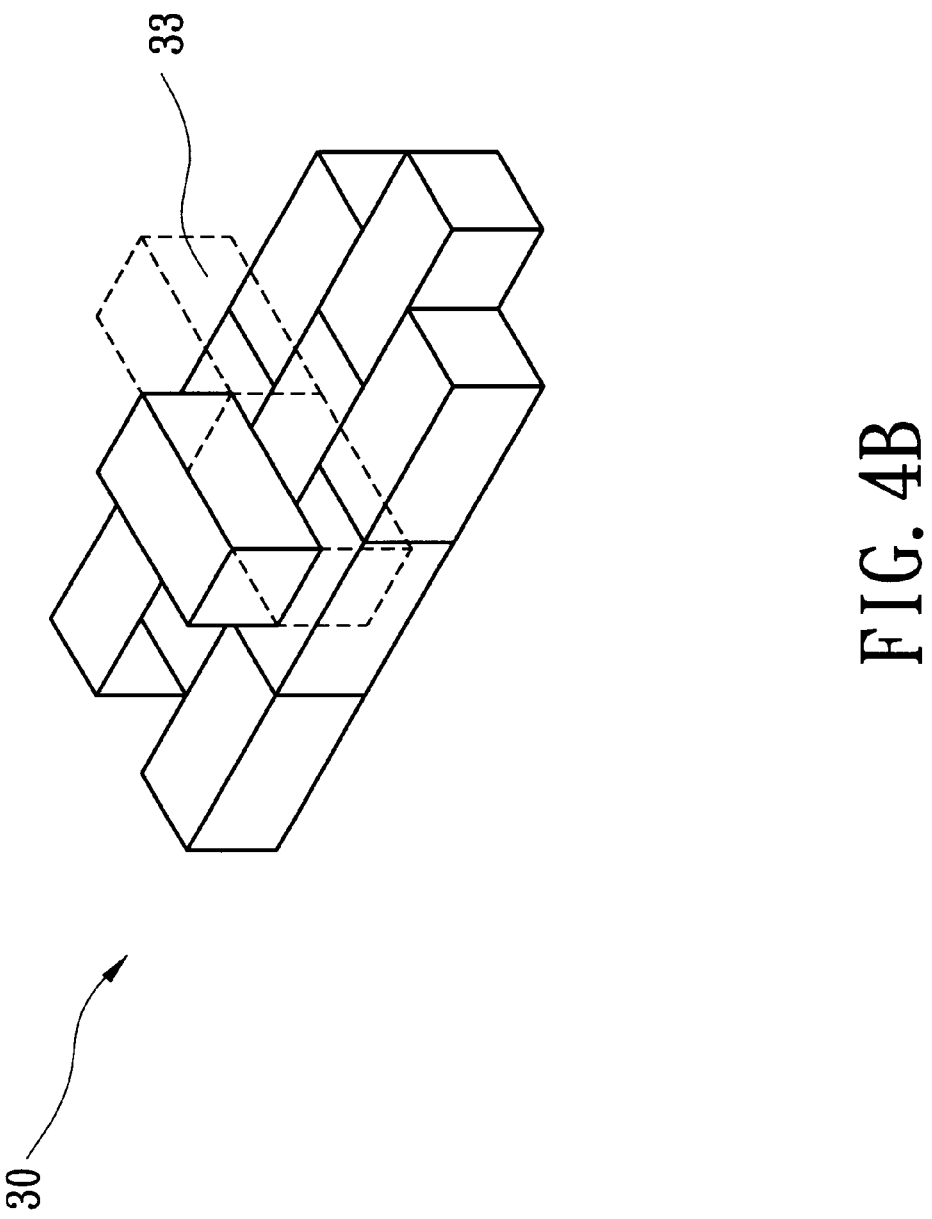

In a second embodiment of the invention, the virtual environment 30 is also divided into more than one sheet-like area 31 along one of the dimensions. Each of the sheet-like areas 31 is divided into more than one stripe-like area 32 along another dimension. However, the partition directions of two adjacent sheet-like areas 31 are orthogonal, as shown in FIG. 4a. Finally, each of the stripe-like areas 32 is divided into subareas 33 along the last dimension. The subareas 33 are also made to interpose with adjacent subareas 33, as shown in FIG. 4b. The interposition conditions are the same as before. Therefore, the same effects can be achieved. However, in comparison with the previous embodiment, the logic conditions are slightly more complicated.

EFFECTS OF THE INVENTION

The disclosed method of area partition in virtual environment makes each of the divided subareas overlap with their adjacent subareas. For example, the subareas on the same plane overlap with each of their adjacent subareas by half of their side length. The subareas on different planes overlap with one another by one half of their width and one quarter of their length. This method reduces the number of adjacent subareas of each subarea down to 14.

The largest number of subareas that an object can cross is also reduced to 4. Therefore, the operation load in such space can be greatly reduced. Although the invention has been described with reference to specific embodiments, this description is not meant to be construed in a limiting sense. Various modifications of the disclosed embodiments, as well as alternative embodiments, will be apparent to persons skilled in the art. It is, therefore, assumed that the appended claims will cover all modifications that fall within the true scope of the invention.

What is claimed is:

1. A method of area partition in virtual environment used into dividing 3D (Three Dimension) virtual environment into a plurality of subareas, which method comprises:

partitioning the virtual environment into more than one sheet-like area along one of the three dimensions;

partitioning each of the sheet-like areas into more than one stripe-like area along another dimension so that the stripe-like areas on adjacent two of the sheet-like areas are interposed; and partitioning each of the stripe-like areas into more than one subarea along the last dimension so that the subareas of adjacent two of the stripe-like areas on the same sheet-like area are interposed.

2. The method of claim 1, wherein the sheet-like areas are of equal widths.

3. The method of claim 2, wherein the stripe-like areas partitioned on the sheet-like areas of equal widths have the same width as the sheet-like areas.

4. The method of claim 3, wherein each of the stripe-like areas is interposed with the stripe-like areas divided on its adjacent two of the sheet-like areas by one half of the width.

5. The method of claim 3, wherein the subareas divided in each of the stripe-like areas are interposed with the subareas partitioned in adjacent two of the stripe-like areas on the same sheet-like area by half of the length.

6. The method of claim 1, wherein the stripe-like areas are of equal widths.

7. The method of claim 1, wherein the subareas are of equal lengths.

8. The method of claim 1, wherein the subareas are interposed with the subareas divided in adjacent two of the sheet-like areas.

9. The method of claim 8, wherein the subareas are interposed with the subareas partitioned in adjacent two of the sheet-like areas by one quarter of the length.

10. The method of claim 1, wherein the step of dividing each of the sheet-like areas into more than one stripe-like area along another dimension so that the stripe-like areas on adjacent two of the sheet-like areas are interposed uses one half the width of the stripe-like area for the interposition.

11. The method of claim 1, wherein the step of partitioning each of the stripe-like areas into more than one subarea along the last dimension so that the subareas of adjacent two of the stripe-like areas on the same sheet-like area are interposed uses one half of the length of the subarea for interposition.

12. A method of area partition in virtual environment used into dividing 3D virtual environment into a plurality of subareas, which method comprises:

partitioning the virtual environment into more than one sheet-like area along one of the three dimensions;

partitioning each of the sheet-like areas into more than one stripe-like area along a second dimension and adjacent two of the sheet-like areas use different second dimensions for partition; and partitioning each of the stripe-like areas into more than one subarea along the last dimension so that the subareas of adjacent two of the stripe-like areas on the same sheet-like area are interposed.

13. The method of claim 12, wherein each of the subareas is interposed with the subareas of adjacent two of the sheet-like areas.

* * * * *